(12) United States Patent
Schlaupitz et al.

(10) Patent No.: US 8,048,363 B2
(45) Date of Patent: Nov. 1, 2011

(54) CONTAINER WITH AN IN-MOLD LABEL

(75) Inventors: Robert Samuel Schlaupitz, New London, WI (US); Timothy P. Clare, Appleton, WI (US); Marilyn A. Roberts, Oshkosh, WI (US)

(73) Assignee: Kimberly Clark Worldwide, Inc., Neenah, WI (US)

( * ) Notice: Subject to any disclaimer, the term of this patent is extended or adjusted under 35 U.S.C. 154(b) by 1 day.

(21) Appl. No.: 11/561,844

(22) Filed: Nov. 20, 2006

(65) Prior Publication Data

US 2008/0116213 A1    May 22, 2008

(51) Int. Cl.
*B29C 49/24* (2006.01)

(52) U.S. Cl. ........ 264/509; 264/129; 264/132; 264/514; 283/81; 428/905; 156/245

(58) Field of Classification Search .............. 425/126.1, 425/503, 522; 264/129, 132, 509, 514, 538, 264/539; 156/215, 244.11, 245, 209, DIG. 10; 428/905; 283/81
See application file for complete search history.

(56) References Cited

U.S. PATENT DOCUMENTS

| | | | | |
|---|---|---|---|---|
| 3,108,850 A | * | 10/1963 | Brandt ....................... | 264/509 |
| 3,516,846 A | * | 6/1970 | Matson ...................... | 503/215 |
| 3,801,689 A | * | 4/1974 | Langecker ................. | 264/509 |
| 4,252,785 A | * | 2/1981 | Isoldi ........................ | 424/76.3 |
| 4,283,011 A | * | 8/1981 | Spector ..................... | 239/36 |
| 4,528,226 A | * | 7/1985 | Sweeny ..................... | 428/40.2 |
| 4,549,863 A | * | 10/1985 | Bourgeois ................. | 425/126.1 |
| 4,572,869 A | * | 2/1986 | Wismer et al. ........... | 428/402.24 |
| 4,585,679 A | * | 4/1986 | Karabedian ............... | 428/34.7 |
| 4,808,454 A | * | 2/1989 | Saitoh ....................... | 428/40.6 |
| 4,837,075 A | | 6/1989 | Dudley | |
| 4,874,129 A | * | 10/1989 | DiSapio et al. ........... | 239/36 |
| 4,883,697 A | * | 11/1989 | Dornbusch et al. ...... | 428/35.7 |
| 4,983,348 A | * | 1/1991 | Barresi et al. ............ | 264/509 |
| 4,986,866 A | * | 1/1991 | Ohba et al. ............... | 156/220 |
| 4,990,381 A | * | 2/1991 | Holzner .................... | 428/35.3 |
| 5,071,704 A | * | 12/1991 | Fischel-Ghodsian ..... | 428/354 |
| 5,223,315 A | * | 6/1993 | Katsura et al. ............ | 428/36.92 |
| 5,238,720 A | * | 8/1993 | Volkman ................... | 428/41.3 |
| 5,242,650 A | * | 9/1993 | Rackovan et al. ........ | 264/509 |

(Continued)

FOREIGN PATENT DOCUMENTS

DE    19724871    12/1997

(Continued)

OTHER PUBLICATIONS

"Advances put a new face on cosmetic and personal care package labels", Cosmetic & Personal Care Packaging Magazine, USA, 2003.*

(Continued)

*Primary Examiner* — Joseph Del Sole
*Assistant Examiner* — Dimple Bodawala
(74) *Attorney, Agent, or Firm* — Armstrong Teasdale LLP

(57) ABSTRACT

A container having a scented label attached using an in-mold label process and methods of making the same. A scented material is supplied to the label, and the label is attached to the container using an in-mold label process. In another embodiment, a container comprises an interior cavity for retaining a substance, and a label adapted to dispense a scent, wherein the label is disposed on an exterior surface of the container using an in-mold label process. The scent may be suggestive of the content of the container.

15 Claims, 5 Drawing Sheets

U.S. PATENT DOCUMENTS

| | | | |
|---|---|---|---|
| 5,254,302 A | | 10/1993 | Yamanaka |
| 5,266,377 A * | | 11/1993 | Kinoshita et al. ............. 428/141 |
| 5,435,963 A * | | 7/1995 | Rackovan et al. ............. 264/509 |
| 5,566,693 A | | 10/1996 | Gunderman et al. |
| 5,591,146 A * | | 1/1997 | Hasse ............................ 604/359 |
| 5,811,163 A | | 9/1998 | Ohno et al. |
| 5,916,646 A * | | 6/1999 | Baudin ......................... 428/36.1 |
| 5,962,082 A | | 10/1999 | Hendrickson et al. |
| 5,980,233 A | | 11/1999 | Oosaki |
| 6,001,208 A * | | 12/1999 | Kinoshita et al. ............. 156/245 |
| 6,102,224 A | | 8/2000 | Sun et al. |
| 6,248,377 B1 * | | 6/2001 | Levine ............................ 426/87 |
| 6,312,760 B1 | | 11/2001 | Wheeler |
| 6,403,186 B1 | | 6/2002 | Tararuj et al. |
| 6,413,548 B1 | | 7/2002 | Hamer et al. |
| 6,508,902 B2 * | | 1/2003 | Lind ............................. 156/245 |
| 6,632,783 B1 | | 10/2003 | Giblin et al. |
| 6,755,350 B2 | | 6/2004 | Rochford et al. |
| 6,773,653 B2 * | | 8/2004 | Miller et al. .................. 264/447 |
| 6,858,283 B2 * | | 2/2005 | Nishizawa et al. ........... 428/137 |
| 6,858,666 B2 | | 2/2005 | Hamer et al. |
| 6,884,381 B1 | | 4/2005 | Hashimoto |
| 6,946,182 B1 * | | 9/2005 | Allgeuer et al. ................ 428/92 |
| 7,004,313 B2 * | | 2/2006 | Mitchell et al. ............. 206/213.1 |
| 7,014,910 B2 * | | 3/2006 | Rochford et al. .......... 428/195.1 |
| 7,381,462 B2 * | | 6/2008 | Kochem et al. ............. 428/319.7 |
| 7,807,243 B2 * | | 10/2010 | Iwasa et al. .................. 428/35.7 |
| 2002/0006455 A1 * | | 1/2002 | Levine .......................... 426/104 |
| 2002/0124945 A1 * | | 9/2002 | Muir et al. .................... 156/245 |
| 2004/0045204 A1 * | | 3/2004 | Miano et al. .................... 40/638 |
| 2004/0166063 A1 * | | 8/2004 | Siegel .......................... 424/10.1 |
| 2004/0170780 A1 | | 9/2004 | Giraud |
| 2004/0224175 A1 * | | 11/2004 | Henderson .................... 428/515 |
| 2005/0186371 A1 * | | 8/2005 | Kimura et al. ............... 428/35.2 |
| 2005/0209116 A1 * | | 9/2005 | Edelman et al. .............. 510/101 |
| 2005/0287241 A1 * | | 12/2005 | Rudolph ....................... 425/503 |
| 2010/0291329 A1 * | | 11/2010 | Di Duca ...................... 428/35.2 |

FOREIGN PATENT DOCUMENTS

| | | |
|---|---|---|
| EP | 0215480 | 3/1987 |
| EP | 0328145 | 8/1989 |
| GB | 2173208 | 8/1986 |
| JP | 2006348072 | 12/2006 |
| WO | 9730903 | 8/1997 |
| WO | 03013843 | 2/2003 |
| WO | 03097114 | 11/2003 |
| WO | 2004014650 | 2/2004 |
| WO | 2005093035 | 6/2005 |

OTHER PUBLICATIONS

"Blow Molding" from Wikipedia, available at http://en.wikipedia.org/wiki/Blow_molding, printed on Nov. 30, 2006.

International Search Report & Written Opinion from PCT/IB2007/054483, dated Jun. 27, 2008, 17 pages.

http://en.wikipedia.org/wiki/Blow_molding#Extrusion_blow_molding, viewed Jun. 22, 2009.

* cited by examiner

CONTAINER WITH AN IN-MOLD LABEL

BACKGROUND OF THE INVENTION

1. Field of the Invention

Embodiments of the present invention generally relate to a container having an in-mold label. Particularly, embodiments of present invention relate to the container having an in-mold label adapted to release a scent and to methods for supplying a scent to a label and affixing the label to a container using an in-mold label process.

2. Description of the Related Art

Many products are often sampled by the consumer prior to their purchase. Some of these products give off a fragrance, flavor, perfume, or other distinctive or pleasant scent. In many cases, the consumer will open a container to gain exposure to the scent of the product. Such practice is common in products such as toiletries. However, the consumer sampling the product in this manner may have the undesired effect of contaminating or inadvertently adulterating the product.

To overcome this problem, a variety of sampling methods have been developed to allow the consumer to sample the product without opening the packaging or container. One method is to make available an "open" sample for sampling on site. This method is often used in the marketing of cosmetics. The method of providing open samples has limited usage and may become quite expensive. Another sampling method is to apply a sticker that has been treated with the fragrance of the product on the packaging. Typically, the sticker is made of paper and includes an adhesive such as glue on the back side of the paper. The fragrance may be added by dosing the sticker with the fragrance oil. The fragrance may also be applied to the sticker using an encapsulation process. This type of sticker is commonly known as the scratch and sniff sticker. One drawback of the sticker sample is that it is removable. Another drawback is that the sticker sample will lose its fragrance in a relatively short period of time with repeated sampling at the shelf.

There is a need, therefore, for a method for associating a fragrance with an article. There is also a need for an article having a mechanism for conveying a scent to a user.

SUMMARY OF THE INVENTION

In one embodiment, a method of attaching a label to an article (e.g., a container) comprises providing a label having a scented material, and attaching the label to the article using an in-mold label process.

In another embodiment, a container is produced by a process which comprises the steps of supplying a scented material to the label; positioning the label in a mold for forming the container; supplying a material for forming the container; and attaching the label to the container.

In yet another embodiment, a container comprises an interior cavity for retaining a substance, and a label adapted to dispense a scent, wherein the label is disposed on an exterior surface of the container using an in-mold label process.

In yet another embodiment, a method of forming a container comprises providing a label, treating the label with a scent, forming the container using an in-mold process, and integrating the label to the container during the in-mold process.

In yet another embodiment, a method of releasing a scent from a container comprises providing a label, treating the label with a scented substance, affixing the label to the container using an in-mold label process, and releasing the scent from the label.

In yet another embodiment, a container has a label adapted to dispense a scent suggestive of a content of the container, wherein the label is disposed on an exterior surface of the container using an in-mold label process, comprising contacting the label with the exterior surface and thermally treating the exterior surface and the label to incorporate the label into the exterior surface.

In yet another embodiment, a method of attaching a label to a container for retail sale comprises providing a label having a scented material suggestive of a content of the container and attaching the label to an exterior surface of the container using an in-mold label process selected from the group consisting of an extrusion blow molding process, an injection molding process, and a stretch blow molding process.

In yet another embodiment, the label may contain one or more polymeric layers. At least one of the layers of the label may be treated with the scented material using any suitable method known to person of ordinary skill in the art. In one embodiment, the scented material is added to the polymer that is subsequently extruded to form the label. In another embodiment, the scented material is encapsulated and subsequently coated on one or more layers of the label.

In another embodiment, the label may be attached to the container using any suitable in-mold label process known to a person of ordinary skill in the art. Exemplary in-mold label processes include injection mold process, extrusion blow mold process, and stretch blow molding.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention relate to methods for forming an article, e.g., a container having an in-mold label adapted to release a scented material. Embodiments further include articles having in-mold labels adapted to release a scented material. In one embodiment, the scent released from the label represents the scent of the substance in a container. In this respect, it is contemplated that, at least in one embodiment, the in-mold label may be used to communicate the scent of a product without tampering with its packaging and/or exposing the contents of the product to ambient. For example, a consumer may sample the fragrance of the contents of the product without opening its packaging.

In one embodiment, the method includes treating the label with a scented material and attaching the label to the container using an in-mold label process. Preferably, the label is attached to an exterior surface of the container.

Figure 1:
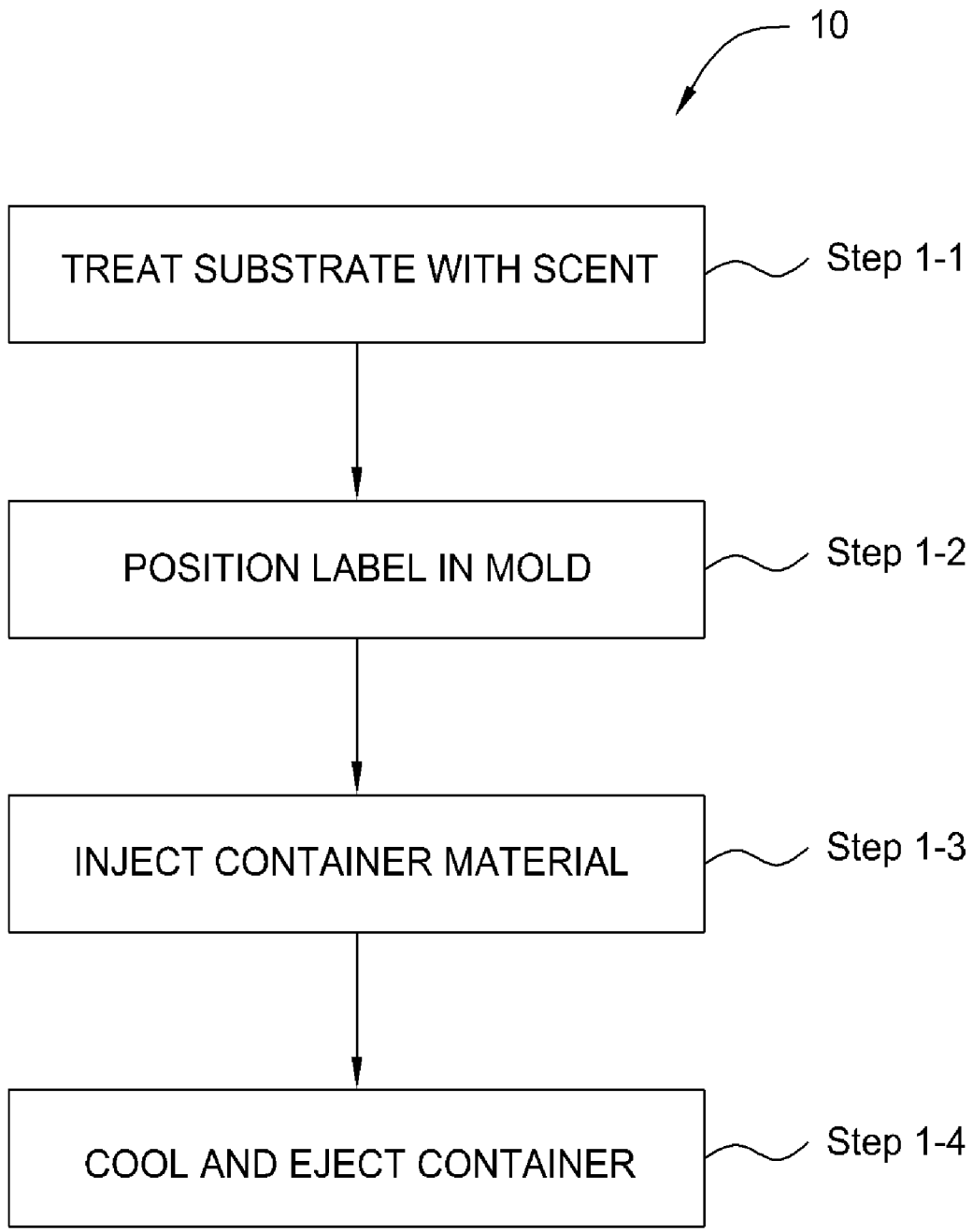
FIG. 1 illustrates a process flow diagram for forming a container having an in-mold label treated with a scented material according one embodiment of the present invention.

FIG. 1 shows a process 10 for forming a container according a preferred embodiment. Initially, a label is treated with a scented material, see step 1-1. The label is then positioned in a mold for forming the container, see step 1-2. Thereafter, the material for forming the structure of the container is heated and injected into the mold, see step 1-3. The structural material may be heated to a temperature between about 365° K. (200° F.) and about 560° K. (550° F.) before it is injected into the mold. During step 1-3, the label and the heated structural material interact, whereby the label is incorporated into the heated structural material that forms the container. Finally, the container is allowed to cool before being ejected from the mold to obtain a container having a label adapted to release a scented material, see step 1-4.

In one embodiment, formation of the label involves extruding a polymeric material through a die to initially form a label film. The label film may include one or more layers of polymeric material. Exemplary polymeric materials include polyethylene (e.g., HDPE, MDPE, LDPE, LLDPE), polypropylene (e.g., PP, OPP), blends of PP and PE, polyvinyl chloride (PVC), polyethylene terephthalate (e.g., PET, EPET, PETG, OPET), polystyrene (e.g., PS, HIPS), and polyamide. In one embodiment, the label film may be a thermoplastic resin layer having a melting point from 135° C. to 264° C. Other suitable materials of the label film include synthetic paper, metal foil, polymer, and combinations of suitable materials.

Figure 2:
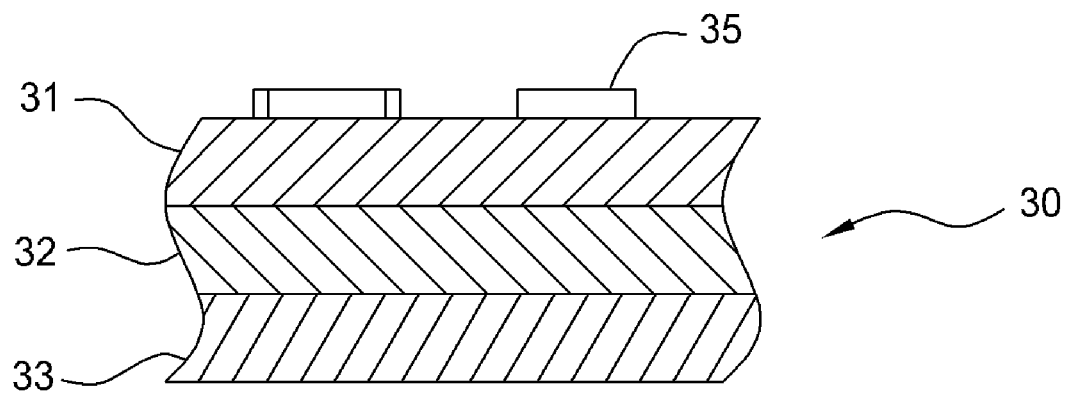
FIG. 2 shows a cross-sectional side view of an exemplary label film.
Figure 3:
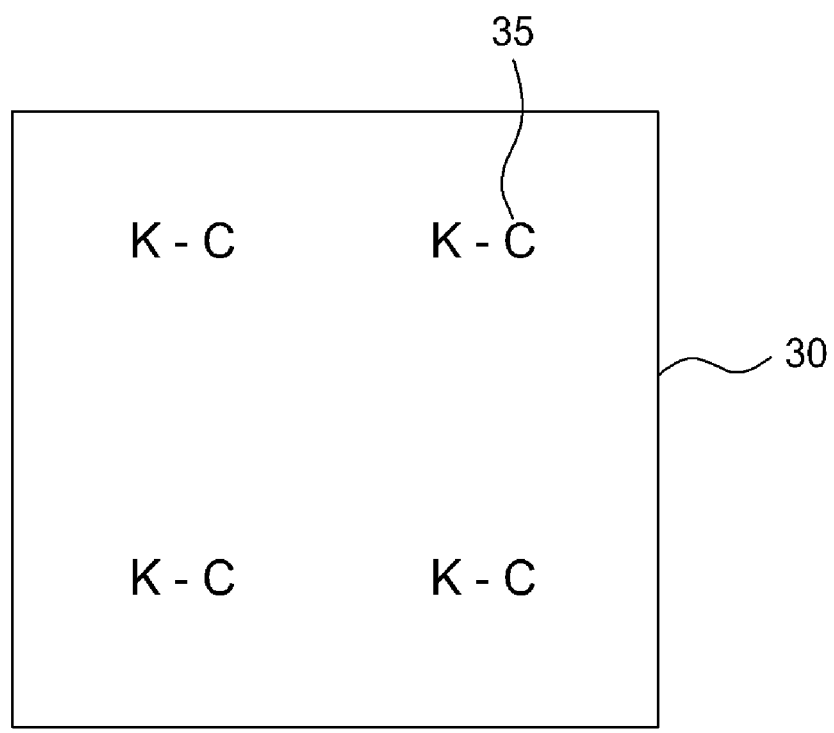
FIG. 3 shows a partial top view of the label film after printing.

FIG. 2 shows a cross-sectional side view of an exemplary label film 30 having a plurality of layers (three shown by way of example). In one embodiment, each of the three layers is made of polymeric material. The first layer 31, the outer layer, is treated with a scented material such as an oil substance during the extrusion process. The second layer 32, the core layer, may include a material that acts as a barrier to prevent the scented material from migrating toward the container. The third layer 33, the inner layer, may include a material that adheres to the exterior surface of the container. Preferably, the inner layer 33 includes a material that is the same or similar to the container material, for example, HDPE. Optionally, the inner layer 33 may include a heat activated resin that would attach the finished label to the container when it comes into contact with the heated structural material of the container. After extrusion, the label film 30 may be optionally moved to a printing station where information 35 such as text and/or graphics may be printed on the label film 30. FIG. 3 shows a partial top view of the label film 30 after passing the printing station. Then, the printed label film 30 may be optionally moved to a cutting station where it is cut into individual labels. These finished labels may then be stored in a magazine or cartridge for use during the in-mold process. In one embodiment, the inner layer 33 may include additives to provide slip and anti-static properties to prevent the labels from sticking to each other while stored in the magazine and to promote separation of the labels to facilitate insertion of the labels into the mold. The size of the finished label may be any suitable size desired for incorporation onto the container. For example, the size of the finished label may be less than one-half or one-fourth of the size of the exterior surface of the container.

Several methods are contemplated for treating the label with a scented material. In one embodiment, the scented material is added to the label during extrusion of the polymeric label film. For example, the scented material may be supplied to a chemical injection feed during the extrusion step such that the label film extruded from the die will have the scented material incorporated therein. Alternatively, a carrier polymer is initially imbibed in the scented material. The imbibed carrier polymer is subsequently blended with a primary polymer and extruded to form the label film. In both cases, a desired portion of the scented material may be advantageously added to the label. For a label containing more than one layer, the scented material may be incorporated into one or more of the layers.

The polymeric label film may be extruded using a cast film process, a blown-film process, or any suitable process known to a person of ordinary skill in the art. These processes may be used to manufacture a film having a thickness from 0.0003 inches to 0.005 inches or higher. In a cast film process, the polymeric label film is extruded in a molten state from an extrusion die ranging in width from 24 inches to 120 inches, although widths above and below this range may also be used. The hot extrudate is fed through a set of calendaring rolls which imparts a finish to the hot extrudate and creates a uniform film thickness. In some instances, the film may be processed for biaxial orientation to impart properties such as toughness to the film. Biaxial orientation may involve various combinations of stretch of the film in the machine direction and cross machine direction. If the film is to be oriented, heat is applied to the film after calendaring and the film is stretched in one direction, either machine direction or cross machine direction. Then the film is reheated and stretched in the opposite direction. If the film is not to be oriented, the film is allowed to cool as it continues through the cast film process. Thereafter, the edges are trimmed evenly, and the film is wound into rolls for subsequent processing such as printing and cutting.

In a blown film process, the label film is manufactured by extruding the molten polymer through a circular die which may include multiple layers of various polymers. The hot extrudate is produced in a tubular form and may be processed without orientation. Alternatively, air may be forced inside the tube to enlarge the tubular diameter beyond the diameter of the circular die and impart an orientation into the film. Adding orientation to the film imparts properties such as toughness and clarity into the film. The tubular film is allowed to cool, and thereafter collapsed into a flat shape. Then the folded ends are trimmed off to provide the film with a desired width. The two halves of the film are wound onto separate rolls for subsequent processing.

In another embodiment, the scented material may be encapsulated and subsequently disposed onto one or more layers of the label. In one embodiment, a scented material such as an oil or oil substance is enclosed in a microcapsule. The shell of the microcapsule may comprise urea-formaldehyde or cross-linked gelatin. Any of the known processes for encapsulating oil may be used to form the microcapsule. In one embodiment, the encapsulation process involves preparing an urea-formaldehyde precondensate using an alkaline catalyzed reaction of urea and formaldehyde in water. The scented material to fill the microcapsule is then added to the precondensate and may be maintained in the form of dispersed particles in the precondensate by agitation. In one embodiment, the scented material is relatively insoluble in the precondensate and inert toward reaction with other components in the precondensate. Thereafter, an acid catalyst is added to the precondensate to promote the formation of the polymerized shell wall of the microcapsule. Thereafter, the temperature of the precondensate may be raised to complete the shell formation. The reaction is allowed to proceed until a desired pH is reached before separation of the newly formed capsules. The microcapsules may be sprayed, printed, or otherwise disposed onto the film either before or after extrusion. In use, the scented material may be released by physically rupturing the shell using pressure, shear force, or heat. In one embodiment, the encapsulated fragrance is disposed in the printed outer layer to allow rupturing of the microcapsule by the consumer for sampling of the fragrance. Exemplary encapsulation processes are disclosed in U.S. Pat. No. 3,516,846 issued to Matson and U.S. Pat. No. 6,413,548 issued to Hamer et al., which patents are herein incorporated by reference in their entirety. It is contemplated that embodiments of the present invention include the use of any suitable method of treating the label with a scented material known to a person of ordinary skill in the art.

In yet another embodiment, the scented material may be printed onto the surface of the label. The scented material may be incorporated into the ink and subsequently applied onto the polymeric label film. Using the above polymeric label films as an example, a label printer applies the ink to the outer layer of the label film. This is usually followed by application of a clear top-coat over the ink to protect the ink against abrasion and other environment factors. The ink is allowed to fully dry (i.e., cure) before the label film is cut into individual labels for use in the in-mold process.

Various printing methods that are common in the industry may be utilized, such as rotogravure, offset lithography, and flexography. Silk screening may also be used, but is not a process that is typically used for large manufacturing quantities. However, the process of silk screening may apply a thicker layer of ink which may be desirable in certain applications. Factors considered when selecting the printing process include the desired ink thickness, viscosity of the printing inks, image to be printed, number of colors, and other operational concerns such as quantity of labels to be produced. The vehicle for delivering the scented material may impact the decision of which label manufacturing process to use. For example, if the scent vehicle is oil, the oil may be a component of the liquid ink and applied to the film using any of the above processes. On the other hand, if the scent vehicle is micro-encapsulated, a flexography process may be preferred over a rotogravure process. Rotogravure cylinders have an etched surface for picking up ink and depositing the inks onto the label film. The etched surface may have difficulty in picking up solids such as the encapsulated sphere for deposition onto the label film.

Forms of the scented material include, but are not limited to, solid, gel, liquid, gas, and combinations thereof suitable for releasing a dispersant into the surrounding atmosphere. Examples of the scented material include fragrances, flavor, natural essential oils, synthetic perfumes, and combinations thereof. Perfumery materials which may form the active ingredient of the scented material include: natural essential oils such as lemon oil, mandarin oil, clove leaf oil, petitgrain oil, cedar wood oil, patchouli oil, lavandin oil, neroli oil, ylang oil, rose absolute or jasmin absolute; natural resins such as labdanum resin or olibanum resin; single perfumery chemicals which may be isolated from natural sources or manufactured synthetically, as for example alcohols such as geraniol, nerol, citronellol, linalol, tetrahydrogeraniol, betaphenylethyl alcohol, methyl phenyl carbinol, dimethyl benzyl carbinol, menthol or cedrol; acetates and other esters derived form such alcohols-aldehydes such as citral, citronellal, hydroxycitronellal, lauric aldehyde, undecylenic aldehyde, cinnamaldehyde, amyl cinnamic aldehyde, vanillin or heliotropin; acetals derived from such aldehydes; ketones such as methyl hexyl ketone, the ionones and methylionones; phenolic compounds such as eugenol and isoeugenol; synthetic musks such as musk xylene, musk ketone and ethylene brassylate.

Figure 4:
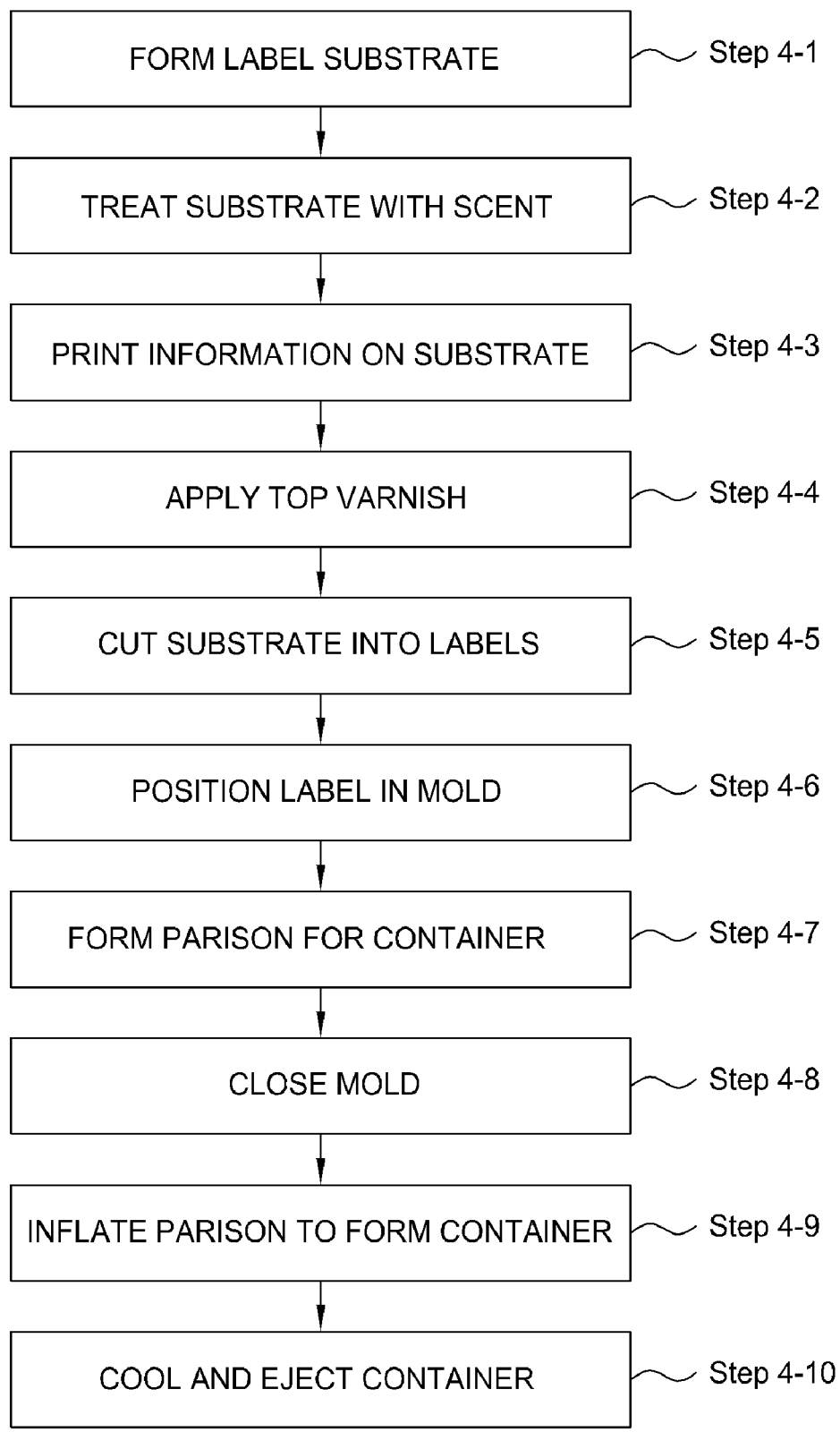
FIG. 4 illustrates a process flow diagram for forming the bottle according another embodiment of the present invention.
Figure 5:
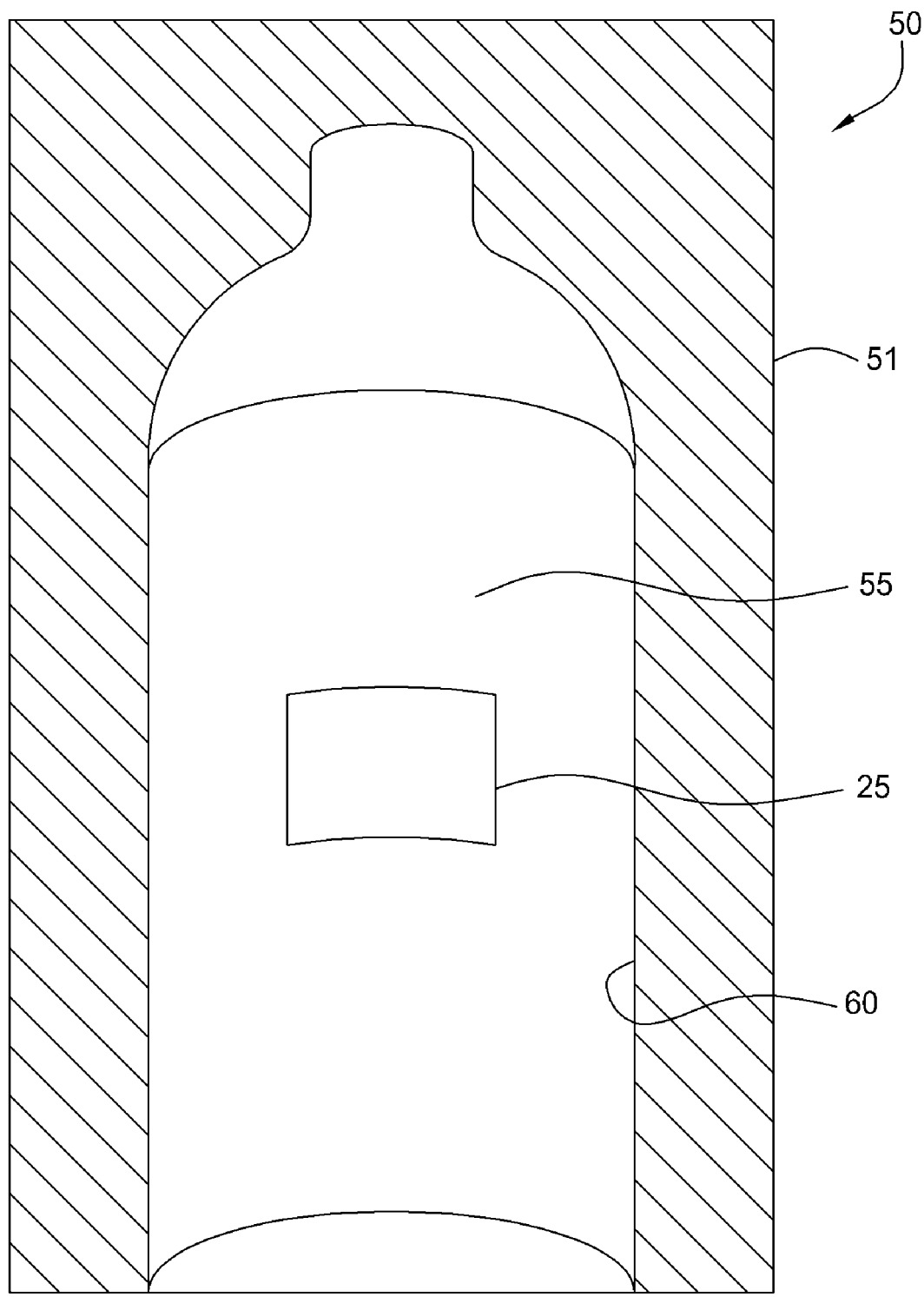
FIG. 5 shows a body portion of an embodiment of a mold.

In a particular embodiment, the label containing the scented material is affixed to an article (e.g., container) using an in-mold label process. It is contemplated that any suitable in-mold label process may be used to affix the label. In one example, a blow mold label process is used to form a high density polyethylene ("HDPE") bottle having an in-mold label treated with a scented material. FIG. 4 illustrates a process flow diagram for forming the bottle. In one embodiment, the label is formed (step 4-1) from a label film having three layers of polymeric material, such as was described with respect to FIG. 2. At step 4-2, a first layer, i.e., the outer layer, is treated with the scented material such as an oil substance during the extrusion process. After forming the label film, information such as text (i.e., alphanumeric characters) and/or graphics may be printed on the label film, see step 4-3. At step 4-4, top varnish or clear coat may be applied on top of the label. In one embodiment, the varnish or coat is sufficiently permeable so that the scented material may release into the surrounding atmosphere. At step 4-5, the label film is then cut into individual labels and stacked in a magazine for retrieval by a robot arm or other suitable conveying apparatus of an in-mold machine. The robot arm picks up a treated label and positions the label in the mold at step 4-6. In one embodiment, the mold includes a right body portion and a left body portion which may be brought together to form the mold. FIG. 5 shows one body portion 51 of an exemplary mold 50. When the body portions are brought together, a cavity 55 is formed in the mold 50 and the interior wall 60 of the mold 50 is in the desired shape of the container. The robot arm positions the label 25 adjacent the wall 60 of at least one of the body portions 51. The robot arm may include a transfer head adapted to engage the label 25 using a vacuum and to deliver the label 25 to the mold 50. Alternatively, the label is held using a static charge or other known manner. FIG. 5 shows the label 25 positioned in the cavity 55. The label 25 may be held in the mold 51 using a vacuum or other suitable means.

Referring back to FIG. 4, at step 4-7, the HDPE material for the container is heated and extruded into the shape of a hollow tube, which is also known as a parison, for insertion into the mold. In one embodiment, the parison is heated to a temperature between about 365° K. (200° F.) and about 560° K. (550° F.) and, more preferably, between about 472° K. (390° F.) and about 505° K. (450° F.). Thereafter, at step 4-8, the mold, which is at a lower temperature relative to the parison, is closed around the parison. At step 4-9, blow air is injected into the hollow portion of the parison at a pressure between about 172.3 kPa (25 psi) to about 1,033.8 kPa (150 psi) to inflate the parison to conform to the cavity wall of the blow mold. During expansion toward the cavity wall, the parison is urged into engagement with the label. The label may attach to the parison as a result of its polymeric makeup. For example, the contact surface, i.e., the inner layer 33, of the label may be formed of the same polymeric material or a similar polymeric material as the container material, thereby facilitating the bonding of the label to the container. Alternatively, the label may attach to the parison using a heat activated resin, adhesive, or sealant layer applied on the contact surface of the label. In each of these embodiments, the label becomes an integral part of the container after engagement with the container. At step 4-10, after the parison cools, the mold is opened to eject the newly formed bottle. In this respect, the bottle formed includes a cavity for retaining a substance and an in-mold label attached to an exterior surface. In use, the in-mold label is adapted to release a scented material. In another embodiment, the treated label may be affixed to the container using an injection blow molding process or a stretch blow molding as is known to a person of ordinary skill in the art. An exemplary injection molding process is disclosed in U.S. Pat. No. 6,884,381 issued to Hashimoto, which patent is herein incorporated by reference in its entirety.

According to one embodiment, a benefit of the in-mold label process is that a "no-label" look may be achieved. In this respect, the in-mold label would not be easily removed or peeled off. One concern of the process is that the scented material may dissipate during the in-mold process. However, any such dissipation would not be sufficient to change the effectiveness of the treated label. One reason is that the scented material is generally treated on the side of the label that faces the cooled cavity wall, which is also the side that does not contact the container. Further, because the label is positioned adjacent the wall of the cooled metal mold, the outer surface of the container in contact with the label cools faster relative to other parts of the parison. Moreover, the molding process is a relatively short process such that an insignificant amount, if any, of the scented material is dissipated during the blow molding process. For example, according to one embodiment, the entire process from inserting the parison and ejecting the newly formed container may only take approximately 10 seconds.

It must be noted that the scented material may be incorporated into any layer or a plurality of layers of the label. In one embodiment, the scented material may be incorporated into an interior layer of the label. For example, the scented material may be disposed on the extrusion tie-layer of the label. The extrusion tie-layer is typically used to adhere or "tie" two separate layers of the label. In one embodiment, the label may include an outer layer that is designed to promote effective ink adhesion for subsequent printing, for example, reversed printing of the layer with the desired information. Examples of outer layer material include OPET (oriented polyethylene terephthalate) or BOPP (biaxially-oriented polypropylene). The label may further include a heat activated inner adhesion layer. The inner adhesion layer may include additives which provide slip and anti-static properties to facilitate separation of the labels during the in-mold label process. An extrusion tie-layer may be used to "tie" the outer layer to the inner layer. Extrusion tie-layers may be non-reactive such as low density polyethylene ("LDPE") and ethylene copolymers or reactive such as maleic anhydride grafted olefins. In one embodiment, the extrusion tie-layer is a semi-rigid opaque polyolefin film.

By incorporating the scented material into the tie-layer, the tie-layer may perform dual functions. In addition to tying the layers, the scented material may permeate from the tie-layer into the outside environment or into the container content, where the container resin allows such permeation. In yet another embodiment, the label may further include a barrier layer disposed between the tie-layer and the inner adhesive layer. An exemplary barrier layer is a layer made from ethylene vinyl alcohol ("EVOH"). In this respect, the barrier layer would prevent the scented material from penetrating into the container and encourage the scented material to permeate only through the outer layer of the label.

One benefit of having the fragrance contained in an interior layer of the label is that the scented material may be released over time. The rate of release may be controlled by the permeation rate through the outer layer. In this respect, the scent dissipation rate through the outer layer may be controlled to ensure that the product will make it to the market place and the label still possesses sufficient scent-generating capability to serve as a sample or to garner interest from the consumer. To further limit scent dissipation, the label may be wrapped or covered either before the label is incorporated onto the container by the in-mold process or after it has been disposed on the container, i.e., the finished container.

In another embodiment, the label may be disposed on a container made from a material that is impervious to scent permeation. For example, the label may include a reversed printed outer layer, an extrusion tie-layer containing the scented material, and a heat activated inner adhesive layer. The label is formed on the container using an in-mold label process. The resin of the container is selected such that it is impervious to significant scent permeation. An exemplary resin for protecting against migration of flavors or aromas is ethylene vinyl alcohol ("EVOH"). EVOH resins are thermoplastic polymers that may be combined with other resins in a co-extrusion blow molding and other suitable processes to form the structural material for the container. Examples of container structural material containing EVOH include: (a) PP/regrind (recycled thermoplastic waste)/EVOH/PP; (b) HDPE/regrind/EVOH/HDPE; (c) HDPE/regrind/EVOH; and (d) PET/EVOH/PET/EVOH/PET. Because use of the non-permeable resin negates the need for the additional barrier layer, this type of container has the added benefit of reducing manufacturing costs.

Figure 6:
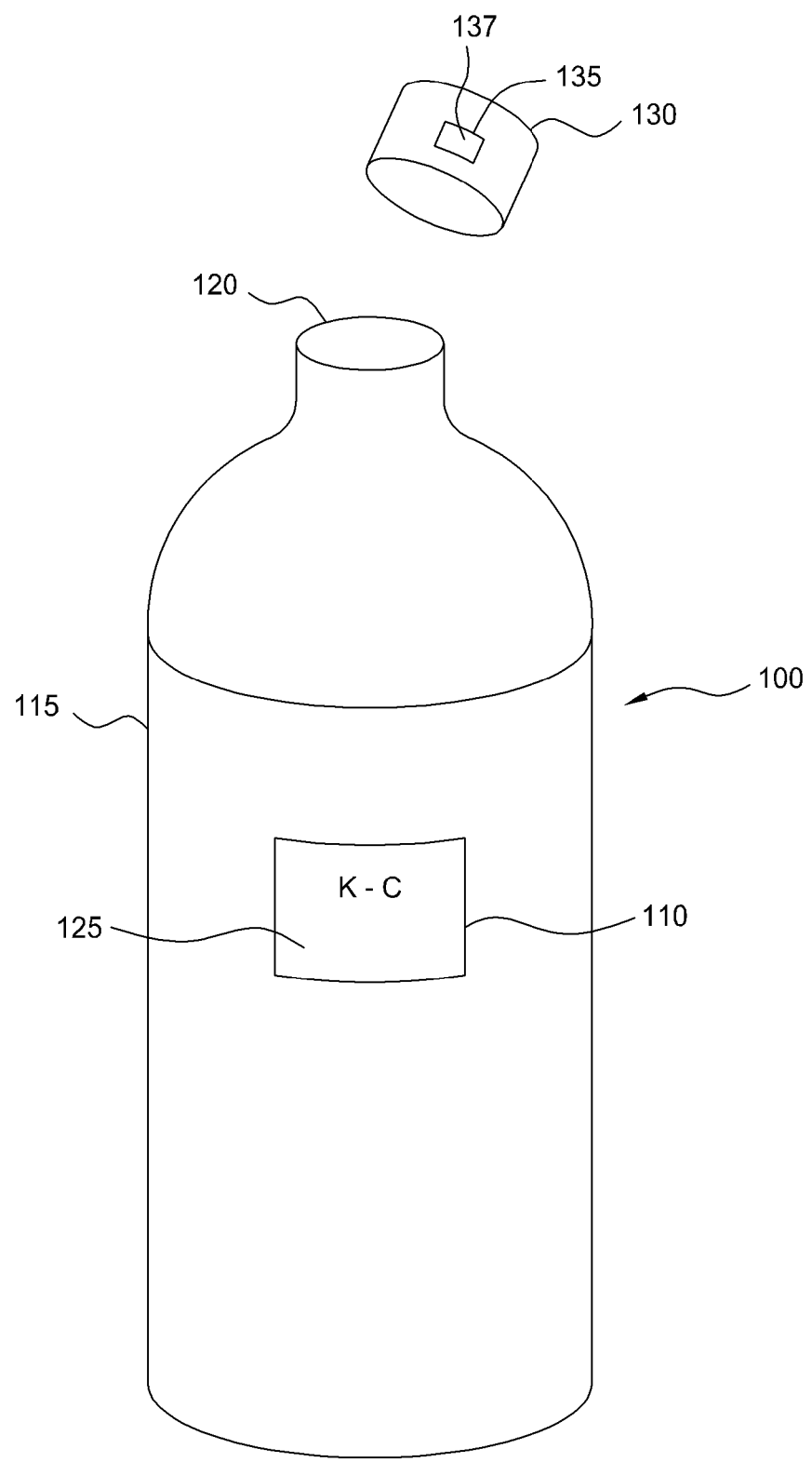
FIG. 6 shows a container having an in-mold label treated with a scented material manufactured in accordance with an embodiment of the present invention.

FIG. 6 shows an exemplary embodiment of a container 100 having an in-mold label 110 adapted to release a scented material. As shown, the container 100 includes a body 115 having a cavity in its interior for retaining a substance. The container 100 also includes an opening 120 for introduction of the substance into the cavity. Preferably, the container 100 is made of a polymeric material. The container 100 may be of any shape, form, or size, so long as it is capable of being formed in an in-mold process. Exemplary containers include, but not limited to, bottle, bowl, jar, and any other containers capable of retaining a substance, which substance may be a solid, liquid, gas, or combinations thereof.

In FIG. 6, the label 110 is disposed on the container 100 using an in-mold label process. The label 110 may be any shape, form, or size. Preferably, the label 110 comprises a polymeric material. More preferably, the polymeric material is the same as or substantially the same as the polymeric material of the container 100. The label 110 may have printed thereon information, graphics, or combinations thereof. As shown, the label 110 is treated with a scented material 125, which may be released into the surrounding atmosphere. The label 110 may be treated with the scented material 125 using any of the processes described above or any other suitable process known to a person of ordinary skill in the art. It is contemplated that a portion or the entire label 110 may be treated with scented material. Although only one label 110 is shown on the container 100, it is contemplated that one or more labels 110 may be attached to the container 100. Further, not all of the labels, if more than one is used, are required to be treated with a scented material. For example, a container may have one label that is treated with a scented material and another label that is not treated with a scented material. Although one or more labels 110 maybe positioned anywhere on the container 100, it is preferred that at least a portion of a label 110 is positioned on an exterior surface of the container 100.

In another embodiment, the container 100 may optionally include a cap 130 adapted to close the opening 120, as illustrated in FIG. 6. The cap 130 may be any shape, form, or size, so long as it is capable of closing at least a portion of the opening 120. In one embodiment, the cap 130 may be manufactured in the same mold as the body 115 of the container 100. Alternatively, the cap 130 may be manufactured separately from the body 115. Preferably, the cap 130 is formed using an in-mold label process. In one embodiment, the cap 130 may be formed with an in-mold label 135. The in-mold label 135 may be treated with a scented material 137, which may be released into the surrounding environment. The label 135 may be positioned on a sidewall of the cap 130 or the top of the cap 130. Because the interior of the cap 130 is at least partially exposed when it is removed, the label 135 may alternatively be positioned on the interior of the cap 130. In another embodiment, the label 135 may cover a portion or the entire cap 130. In yet another embodiment, at least one in-mold label 110, 135 treated with scented material 125, 137 is positioned on the body 115, the cap 130, or both.

Containers formed in accordance with embodiments of the present invention would find application in the promotion of any food, toiletries, cosmetics, or any product that has a distinctive or pleasant aroma. In addition, treated in-mold labels may serve as a warning label, for example, if the scent on the treated label is detected; a problem exists with the product. As a particular example, the label may be adapted to release a scent, or change the scent being released, upon exposure to a particular environmental effect or after a predetermined period of time. For example, the label may be placed on fungible goods and may be treated with a time-released scent that conveys to a user spoilage of the associated good.

While the foregoing is directed to embodiments of the present invention, other and further embodiments of the invention may be devised without departing from the basic scope thereof, and the scope thereof is determined by the claims that follow.

What is claimed is:

1. A method of attaching a label to a container for retaining a substance therein, comprising:
    providing a label having a scented material, wherein the label includes a plurality of layers, and wherein the plurality of layers include an outer permeable layer and an interior layer, wherein the scented material is incorporated into the interior layer of the label, the scented material releasing a scent that corresponds to the substance, and wherein the outer permeable layer is one of an oriented polyethylene terephthalate (OPET) and a biaxially-oriented polypropylene (BOPP); and
    attaching the label to the container using an in-mold process, wherein the in-mold process is a stretch blow molding process.

2. The method of claim 1, wherein the label is attached to an exterior surface of the container.

3. The method of claim 1, wherein providing the label comprises enclosing the scented material in a capsule and disposing the capsule on the label.

4. The method of claim 3, wherein the capsule comprises one of urea-formaldehyde and gelatin.

5. The method of claim 1, wherein the label includes one or more polymeric layers.

6. The method of claim 5, wherein the scented material is supplied to at least one or more layers.

7. The method of claim 1, wherein the scented material comprises one of a fragrance, perfume, and flavor.

8. The method of claim 1, wherein attaching the in-mold label comprises:
    positioning the label in a mold;
    extruding a container material into the mold; and
    inflating the container material into contact with the label.

9. The method of claim 8, wherein each of the label and the container comprises the same polymeric material.

10. A method of attaching a label to a container for retaining a substance therein, comprising:
    forming a label having a scented material by adding the scented material to the label during extrusion of the label and extruding the label; and
    attaching the label to the container using an in-mold label process;
    wherein the label includes a plurality of layers;
    wherein the plurality of layers includes a permeable outer layer and an interior layer, wherein the scented material is incorporated at least into the interior layer of the label and corresponds to the substance, and wherein the permeable outer layer is one of an oriented polyethylene terephthalate (OPET) and a biaxially-oriented polypropylene (BOPP); and
    wherein the in-mold label process is a stretch blow molding process.

11. The method of claim 10, wherein adding the scented material during extrusion comprises adding the scented material to a carrier polymer and blending the carrier polymer to a primary polymer that forms the label.

12. The method of claim 10, wherein the scented material is further incorporated into the outer layer of the plurality of layers.

13. A method of attaching a label to a container for retaining a substance therein, comprising:
    forming a label having a scented material by adding the scented material to a carrier polymer and blending the carrier polymer to a primary polymer that forms the label; and
    attaching the label to the container using an in-mold label process;
    wherein the label includes a plurality of layers;
    wherein the plurality of layers includes a permeable outer layer and an interior layer, wherein the scented material is incorporated into the interior layer of the label, the scented material being adapted to release a scent that corresponds to the substance, and wherein the permeable outer layer is one of an oriented polyethylene terephthalate (OPET) and a biaxially-oriented polypropylene (BOPP); and
    wherein the in-mold label process is a stretch blow molding process.

14. A method of attaching a label to a container for retaining a substance therein, comprising:
    providing a label having a scented material corresponding to the substance, wherein the label includes:

a plurality of layers that includes:
- a permeable outer layer containing label information, the permeable outer layer comprising one of an oriented polyethylene terephthalate (OPET) and a biaxially-oriented polypropylene (BOPP),
- an inner layer for attachment of the container, and
- an intermediate layer containing the scented material, wherein the scented material is enclosed in a capsule comprising urea-formaldehyde;

attaching the label to the container using an in-mold label process; and releasing the scented material through the permeable layer;

wherein the in-mold label process is a stretch blow molding process.

15. The method of claim 14, wherein the permeable outer layer is adapted to control a rate of release of the scented material.

* * * * *